United States Patent [19]
Ogawa

[11] Patent Number: 6,018,331
[45] Date of Patent: Jan. 25, 2000

[54] FRAME DISPLAY CONTROL IN AN IMAGE DISPLAY HAVING A LIQUID CRYSTAL DISPLAY PANEL

[75] Inventor: Yasunori Ogawa, Tokyo, Japan

[73] Assignee: NEC Corporation, Tokyo, Japan

[21] Appl. No.: 08/985,271

[22] Filed: Dec. 4, 1997

[30] Foreign Application Priority Data

Dec. 4, 1996 [JP] Japan .................................. 8-323238

[51] Int. Cl.[7] ...................................................... G09G 3/36
[52] U.S. Cl. ........................... 345/99; 345/132; 345/118; 345/100
[58] Field of Search .................................. 345/1, 3, 903, 345/98, 99, 100, 103, 131, 132, 213, 340, 342, 118; 348/476, 477, 478, 479

[56] References Cited

U.S. PATENT DOCUMENTS

| | | | |
|---|---|---|---|
| 5,673,062 | 9/1997 | Katakura et al. | 345/95 |
| 5,801,672 | 9/1998 | Masuda et al. | 345/98 |
| 5,805,149 | 9/1998 | Yuki et al. | 345/202 |
| 5,867,140 | 2/1999 | Rader | 345/98 |
| 5,883,609 | 3/1999 | Assada et al. | 345/100 |
| 5,903,253 | 5/1999 | Mizutome et al. | 345/132 |

FOREIGN PATENT DOCUMENTS

| | | |
|---|---|---|
| 0 421 772 A2 | 4/1991 | European Pat. Off. . |
| 0 456 165 A2 | 11/1991 | European Pat. Off. . |
| 0 674 207 A1 | 9/1995 | European Pat. Off. . |
| 3-89784 | 4/1991 | Japan . |
| 3-160426 | 7/1991 | Japan . |
| 8-211851 | 8/1996 | Japan . |

OTHER PUBLICATIONS

Patent Abstracts of Japan, vol. 97, No. 7, Jul. 31, 1997.

*Primary Examiner*—Richard A. Hjerpe
*Assistant Examiner*—Benjamin D. Bowers
*Attorney, Agent, or Firm*—Sughrue, Mion, Zinn, Macpeak & Seas, PLLC

[57] ABSTRACT

An image display device having a liquid crystal display panel in which display picture elements are arranged according to a dot matrix form includes a control circuit that controls the drive of a source driver and gate driver such that writing of signals for frame display in a horizontal direction is performed during the vertical blanking interval of input image signals. During the vertical blanking interval, the control circuit writes to the source driver each source selection signal of picture elements that are to display the horizontal frame and holds this data. The control circuit then generates sequential gate selection signals from the gate driver while supplying the held output of the source driver to the sources of the picture elements, and supplies horizontal frame display signals to the picture elements.

6 Claims, 9 Drawing Sheets

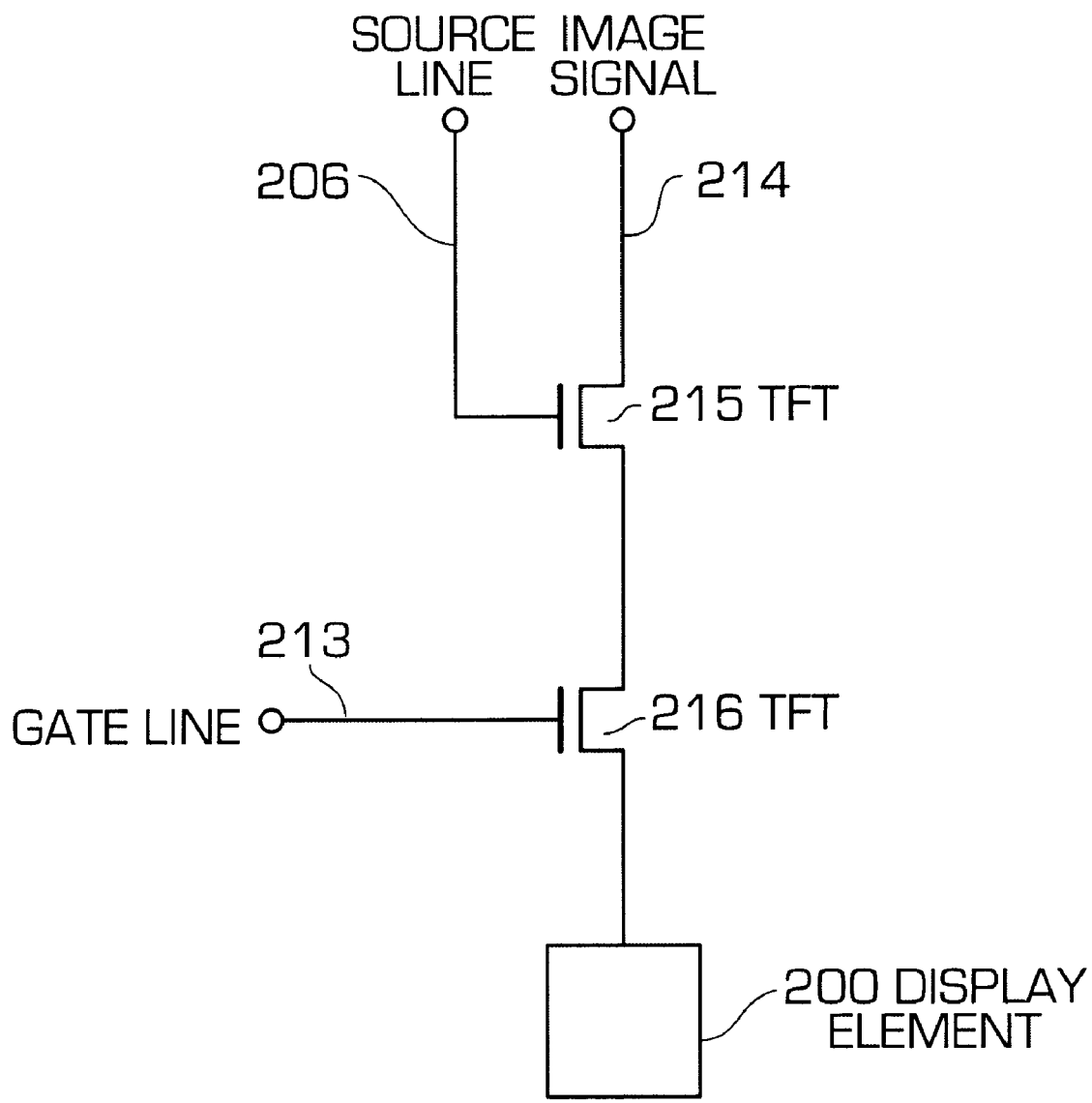

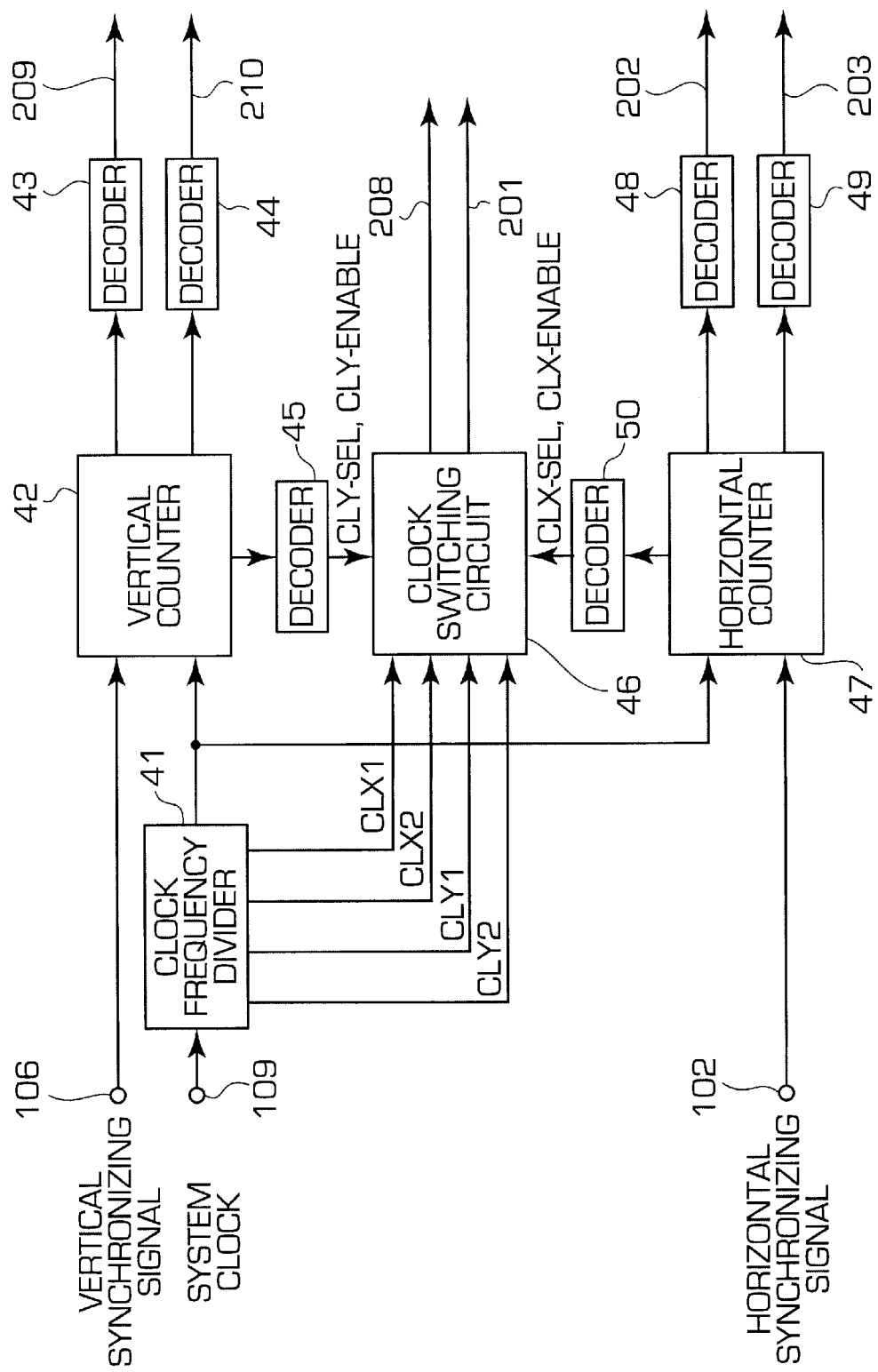

FRAME DISPLAY CONTROL IN AN IMAGE DISPLAY HAVING A LIQUID CRYSTAL DISPLAY PANEL

BACKGROUND OF THE INVENTION

1. Field of the Invention

The present invention relates to an image display device, and more particularly to an image display device having a liquid crystal display panel in which display picture elements are arranged in dot matrix form and in which a frame is displayed around the periphery of the display portion of an inputted image signal in cases in which the number of display picture elements that display an inputted image signal are fewer than the number of picture elements in the display panel.

2. Description of the Related Art

A prior-art example of an image display device in which image picture elements are arranged in dot matrix form is disclosed in, for example, Japanese Patent Laid-open No. 160426/91. In this example of the prior art, each of the RGB colors in a projector system using a frontal projection tube are reconstituted on the surface of a reflecting screen to form a color image on the screen surface. In this case, a frame image is projected around the original image by fixing the inputted RGB signal levels at prescribed levels in the vertical blanking interval and horizontal blanking interval.

Japanese Patent Laid-open No. 89784/91 further discloses technology in this field. In this example of prior art, in cases in which the light intensity of a light source is modulated by a liquid crystal light bulb and projected onto a screen by way of projection optics to form an image, blanking interval processing is effected by monotonously varying the length of the horizontal blanking interval changed in proportion to the vertical blanking interval to avoid trapezoid distortion.

These examples of the prior art therefore differ from the object of the present invention, which is a method of producing a display frame in cases of input of an image signal having fewer image picture elements than the number of picture elements of the image display device in an image display device arranged in dot matrix form.

As examples of the prior art that are directly related to the present invention, cases will next be described in which various types of image signals are displayed on a liquid crystal display device constructed from a common liquid crystal panel using TFT (thin-film transistor) elements.

The liquid crystal panel shown in FIG. 1 is constructed as follows. Liquid crystal display elements that ordinarily employ TFT elements as switching elements of voltage applied to liquid crystal picture elements are of a construction in which the drain terminals of the TFT elements are connected to the liquid crystal picture element electrodes, and vertical and horizontal gate terminals and source terminals are connected in common. By applying voltage to the common gate terminals that brings about a conductive state between the source and drain of TFT elements, ON voltage is applied to all TFT elements (usually, one horizontal line portion of a display screen) connected to the common gate terminals, whereby the source-drain of the TFT elements enters a conductive state. Writing of image signals to liquid crystal picture elements is then carried out by sequentially applying the voltage of each respective picture element to the common source terminals as image signals.

The common gate terminals and common source terminals are driven by two types of drive circuits, referred to as source driver 104 and gate driver 105, which are connected to each terminal.

In a case in which input signals for picture elements numbering 1280 horizontally and 1024 vertically are displayed on liquid crystal panel 108 having picture elements for 1280 vertical dots by 1024 horizontal dots as shown in FIG. 1, writing of the frame is not necessary because the image data for one picture element can be displayed on each respective dot of the liquid crystal panel.

However, in the case of displaying image signals that have fewer picture elements than the number of picture elements of the image display device both for the number of horizontal and vertical picture elements, for example, if the number of picture elements of input signals is 640 horizontally and 400 vertically, the image data for one picture element may be displayed as four dots on the liquid crystal panel by doubling the image data for one picture element both horizontally and vertically, thereby realizing a display using as the display surface 1280 dots horizontally and 800 dots vertically of the picture elements of the liquid crystal panel, as shown in FIG. 2A. Here, a frame display is realized by applying either a black-level voltage or another voltage in the vertical blanking intervals for the picture elements of the areas 110 and 111 in which an image is not displayed in the vertical direction.

For a case in which the number of picture elements of the input signal that are thus doubled horizontally and vertically does not exceed the number of picture elements of the liquid crystal panel, the image may be displayed larger by doubling horizontally and vertically. For input signals that can be handled at other integer powers that do not exceed the number of picture elements of the employed liquid crystal panel either horizontally or vertically, display that is enlarged by an integer power may be carried out by multiplying by an integer.

In a case in which the number of picture elements of input signals is, for example, 800 horizontally and 600 vertically, all of the picture elements of the liquid crystal panel may be driven by displaying the input image signals in the center of the liquid crystal panel and displaying the peripheral portion as black, as shown in FIG. 2B.

In this case, the drive of picture elements in areas 112 and 113 in which an image is not displayed in the horizontal direction is effected in the horizontal blanking interval (FIG. 3A), and drive of picture elements of areas 110 and 111 in which an image is not displayed in the vertical direction is effected in the vertical blanking interval (FIG. 3B).

In some cases, the time of the blanking interval is inadequate for some types of input signals, and sufficient time is thus not available for writing to all picture elements corresponding to a processed frame portion at usual speeds for displaying images. In other words, if the number of picture elements of input signals within one horizontal interval (for example, the number of samplings when digitizing the image data for digital processing) falls short of the number of picture elements in the horizontal direction of the image display device on which the image is to be displayed, not all of the picture elements in the horizontal direction within one horizontal interval can be driven.

In the prior art, such cases could be handled by reducing the time for writing to picture elements, i.e., by somewhat accelerating the shift clock (CLX or CLY) of the source driver when there is not enough time for the horizontal direction or of the gate driver when there is not enough time for the vertical direction.

In methods in which the source driver is accelerated, however, there are cases in which sufficient time was not available for applying voltage to each picture element, with the resulting drawback that, in cases in which the frame around the periphery of a display of an input image is to be, for example, black, an adequate black-level signal could not be written to the relevant picture elements and a satisfactory display of a black frame could not be obtained.

SUMMARY OF THE INVENTION

It is an object of the present invention to provide an image display device that when displaying image signals having a number of picture elements fewer than the number of picture elements in the image display device in the center of the display device, and displaying a frame around the periphery of the displayed image, can display the frame adequately even in cases in which the input signals have a short horizontal blanking interval.

When displaying image signals having fewer picture elements than the number of picture elements in the image display device in which picture elements are arranged in dot matrix form, an image display device according to the present invention displays the input image signals in the center of the image display device, and moreover, when displaying frame data as black display or as any arbitrary pattern in the surplus peripheral areas, overcomes the above-described problem of the prior art by controlling the drive method of the image display device and effecting display of the frame area in the horizontal direction in the vertical blanking interval, which has a time surplus, rather than in the horizontal blanking interval.

In other words, an image display device according to the present invention includes a control means that effects drive control of the source driver and gate driver such that signal writing for frame display in the horizontal direction is effected within the vertical blanking interval of inputted image signals.

In more specific terms, the source driver includes a shift register having shift output that corresponds to the sources of display picture elements, and in response to the start of the vertical blanking interval, the control means executes control such that each source selection signal of display picture elements corresponding to the horizontal direction of the frame is written to and held in the shift register, and in response to completion of writing by the source selection signal writing means, sequential gate selection signals are generated from the gate driver while the held output of the shift register is being supplied to each source of the display picture elements, and signals for frame display in the horizontal direction are supplied to the display picture elements. The control means additionally resets the contents held in the shift register in response to the completion of supply of signals for frame display in the horizontal direction to the display picture elements.

The above and other objects, features, and advantages of the present invention will become apparent from the following description with references to the accompanying drawings which illustrate examples of the present invention.

BRIEF DESCRIPTION OF THE DRAWINGS

FIG. 6 shows the structure of a liquid crystal picture element in the embodiment shown in FIG. 4;

FIG. 9 is a block diagram showing an example of timing control circuit 103 of FIG. 4.

DETAILED DESCRIPTION OF THE PREFERRED EMBODIMENTS

Figure 4:
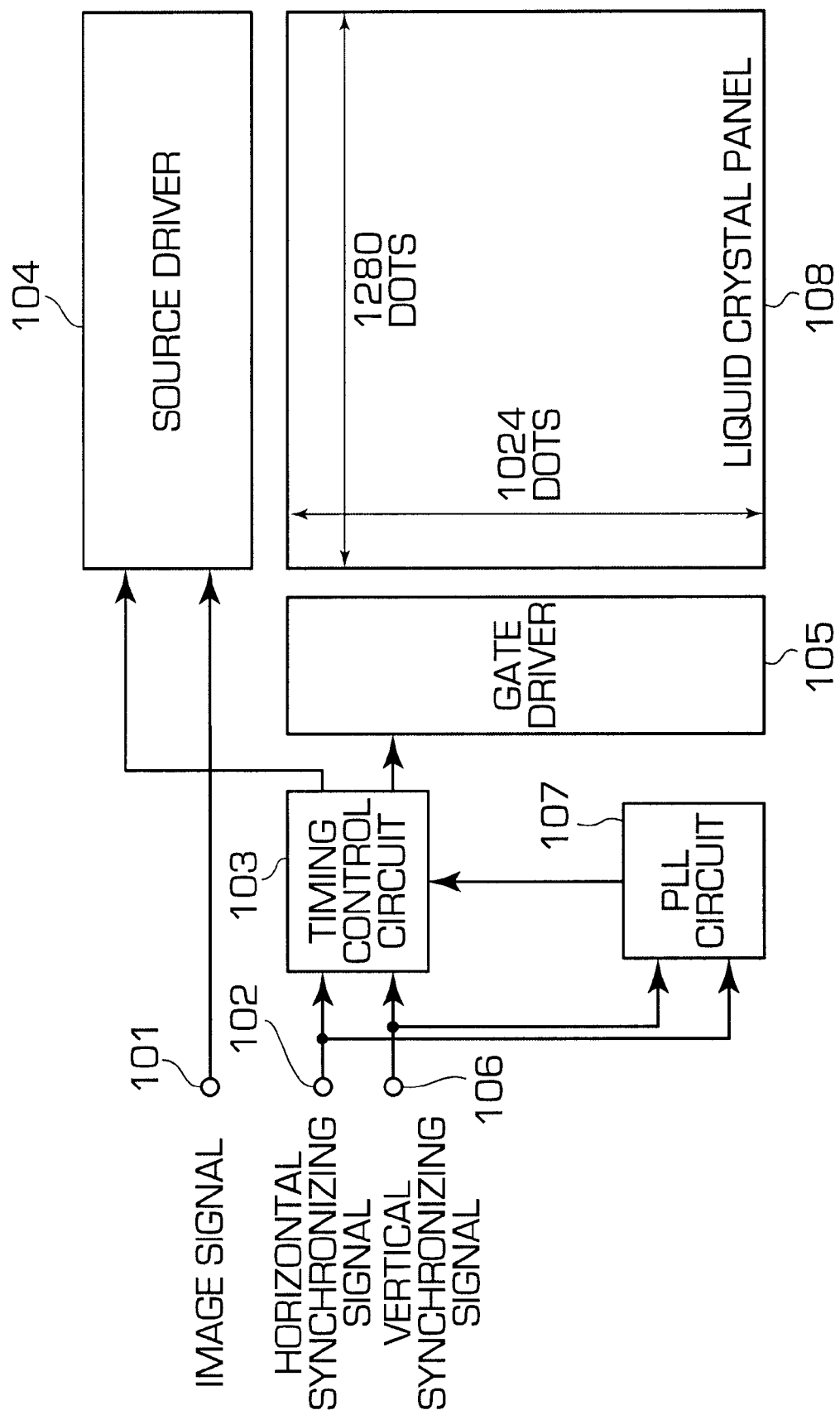
FIG. 4 is a schematic block diagram showing an embodiment of the image display device of the present invention.

Referring to FIG. 4, an embodiment of the image display device according to the present invention comprises: image signal input terminal 101; horizontal synchronizing signal input terminal 102; vertical synchronizing signal input terminal 106; liquid crystal panel 108 in which display picture elements are arranged in dot matrix form; source driver 104 that selects the sources of display picture elements; gate driver 105 that selects the gates of display picture elements; timing control circuit 103 which supplies each type of timing pulse and clock to source driver 104 and gate driver 105 to display input image signals on liquid crystal panel 108; and PLL circuit 107 which generates clocks necessary for driving liquid crystal panel 108 from inputted synchronizing signals and each type of clock necessary for image signal processing.

Figure 5A:
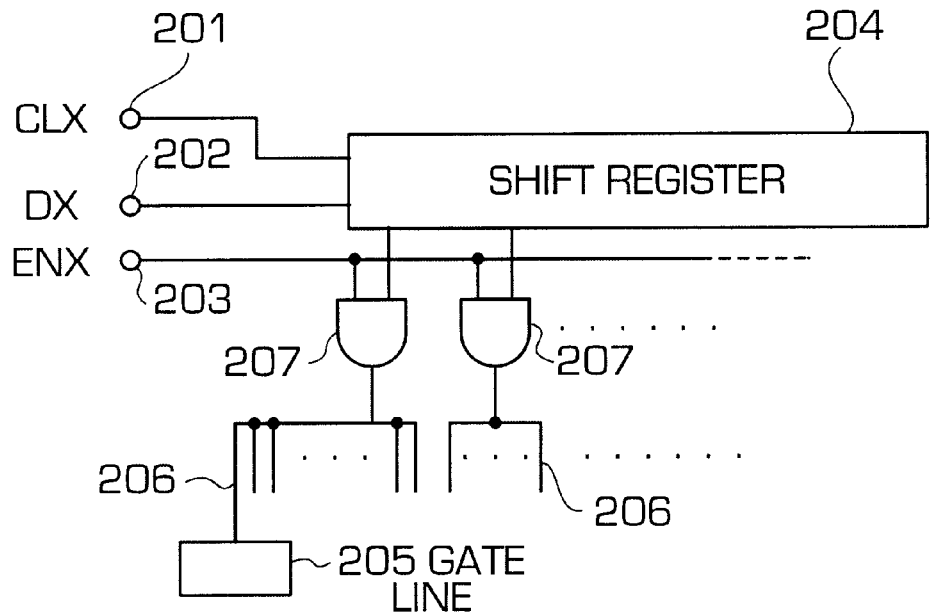
FIGS. 5A and 5B are block diagrams showing the source driver and gate driver, respectively, of the embodiment of FIG. 4.
Figure 5B:
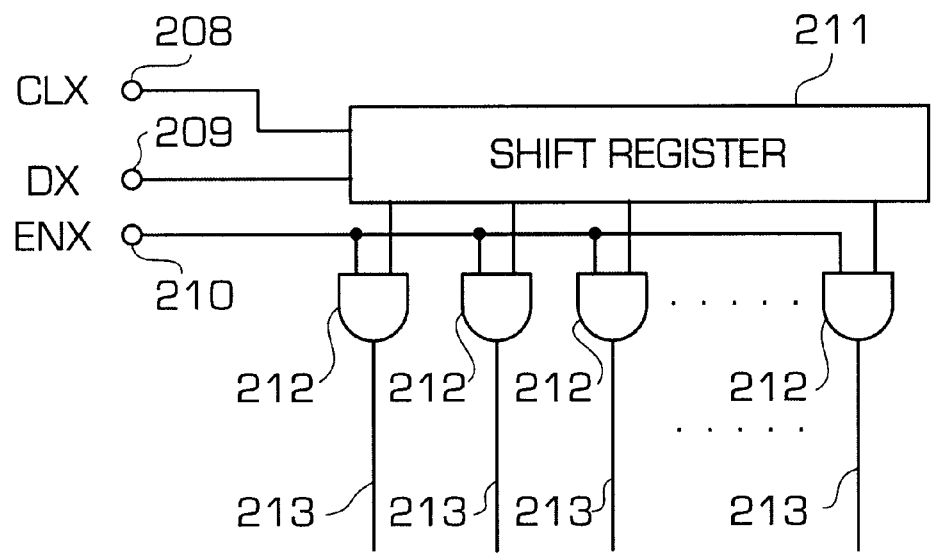

Source driver 104 and gate driver 105 in the present embodiment consists of shift registers and gate circuits as shown in FIGS. 5A and 5B, respectively. In other words, the output terminals of shift register 204 in source driver 104 and shift register 211 in gate driver 105 are wired to the TFT that constitute each picture element, and image data are written to each picture element by turning these TFT on/off.

Referring to FIG. 5A, which shows a block diagram of source driver 104, start pulse (DX) 202 is supplied to the shift input of shift register 204. This start pulse (DX) 202 is sequentially shifted within shift register 204 in accordance with shift clock (CLX) 201. This shift output is supplied to each individual AND gate 207 opened by enable signal 203. The output of each AND gate 207 is supplied to the source line 206 of each picture element 205.

FIG. 6 shows a concrete example of the circuit of picture element 205. Picture element 205 is configured from the series connection of TFT 215 and 216, the gate terminal of TFT 215 constituting source line 206 and the gate terminal of TFT 216 constituting gate line 213. Image signal 214 is supplied to liquid crystal display element 200 and displayed only when selection signal are simultaneously supplied to both gate terminals of these TFT 215 and 216.

Referring to FIG. 5B which shows a block diagram of gate driver 105, start pulse 209 is supplied to the shift input of shift register 211. This start pulse 209 is sequentially shifted within shift register 211 in accordance with shift clock 208. The shift output is supplied to each individual AND gate 212 that opens in accordance with enable signal 210, and the output of these AND gates 212 is supplied to the gate lines 213 of picture elements 205.

FIG. 9 is a block diagram showing an actual example of timing control circuit 103 of FIG. 4, and FIG. 8 shows timing charts of the operation of each section. Details of timing control circuit 103 of FIG. 9 are presented after the explanation of the operation of this embodiment to further clarify timing control circuit 103.

Figure 7:
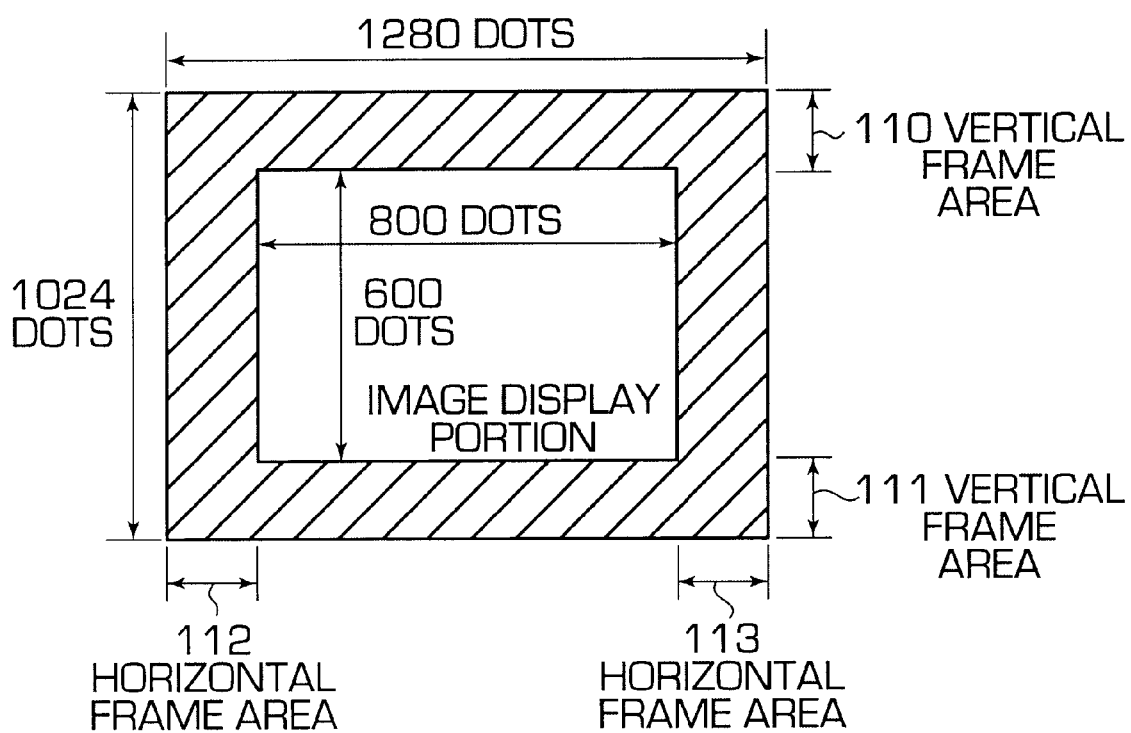
FIG. 7 shows an example of the image display in the embodiment of FIG. 4.

In a case in which the number of picture elements of liquid crystal panel 108 is, for example, 1280 dots horizontally and 1024 dots vertically, and an input image signal having picture elements numbering 800 horizontally and 600 vertically is to be displayed on this liquid crystal panel 108 as shown in FIG. 7, the input image signal is displayed in the center and the periphery is made a frame displayed as, for example, black. Here, writing of black-level signals to picture elements corresponding to the frame in the horizontal direction is carried out in the vertical blanking interval rather than in the horizontal blanking interval, and allowing driving of these picture elements in the vertical blanking interval in this way enables normal display of the frame in the horizontal direction even in a case in which the horizontal blanking interval is short and insufficient for driving all of the picture elements in the frame, as in this case, in which the picture elements to be treated as the frame number 480 dots horizontally (1280 dots–800 dots).

Source driver 104 is driven at high speed in the vertical blanking interval according to the timing chart shown in FIG. 8. Regarding the horizontal direction at this time, each control for start pulse (DX) 202 and shift clock (CLX) 201 of source driver 104 is executed as shown in FIG. 8 such that source lines 206 turn on only for the portion corresponding to the frame.

In the case of the input image signals in this embodiment, start pulse (DX) 202 of source driver 104 is supplied to source driver 104 so as to turn on only the 240 source lines 206 of picture elements in the frame display areas to the left and right in the horizontal direction. Essentially, by conferring this type of start pulse 202, only those picture elements that are intended for execution of frame display can be displayed as frame data, as explained hereinbelow.

Figure 8A:
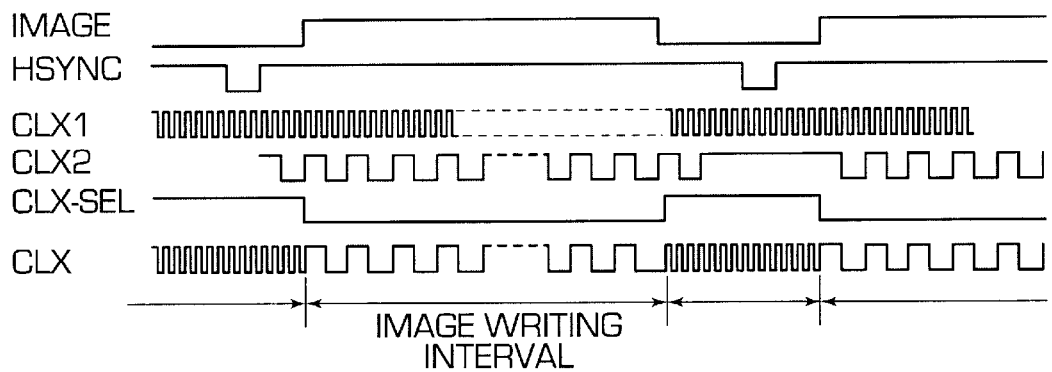
FIGS. 8A, 8B, and 8C are timing charts for horizontal blanking interval drive, vertical blanking interval drive, and vertical blanking interval horizontal writing drive, respectively, in the embodiment of FIG. 4.
Figure 8B:
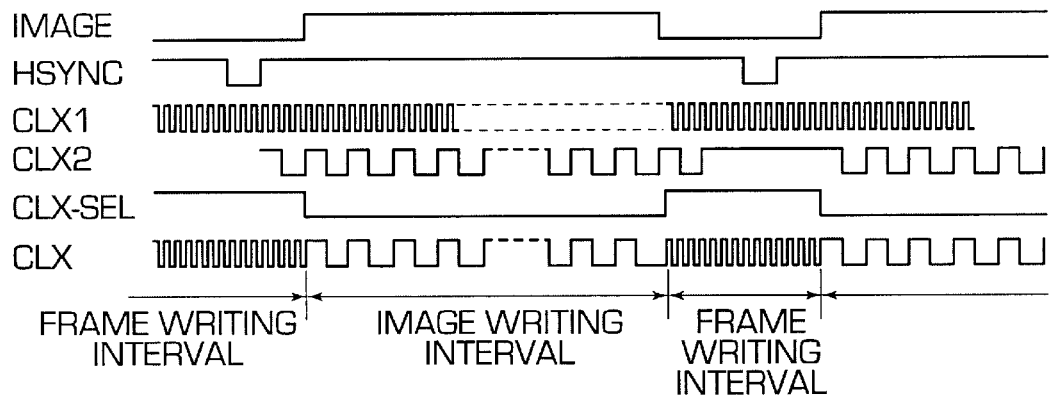
Figure 8C:
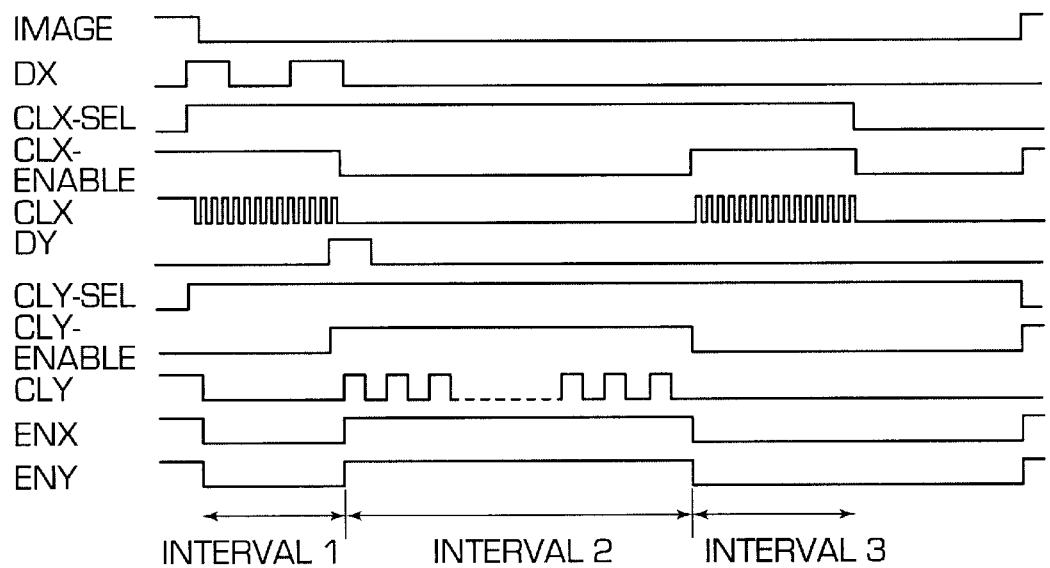

Interval 1 shown in FIG. 8C is the period during which source driver 104 is thus driven so as to turn on source lines 206 only for portions corresponding to the frame in the horizontal direction. Moreover, making enable signal (ENX) 203 of source driver 104 a low-level signal during this interval in which processing of source driver 104 takes place prevents any influence upon image display areas during the processing period of source driver 104.

After completion of interval 1 in which source driver 104 is driven, shift clock (CLX) 201 of source driver 104 is halted, and during the interval up to completion of writing of frame data in the horizontal direction, the state of source driver 104 is maintained and source lines 206 of areas corresponding to the frame in the horizontal direction remain unchanged in the ON state.

Following completion of the processing of source driver 104 as described hereinabove, enable signal (ENX) 203 of source driver 104 is made high level, thereby enabling writing of image signals to picture elements corresponding to the frame in the horizontal direction. Essentially, the supply of image data to picture elements corresponding to the frame in the horizontal direction is enabled by the processing up to this point, and the state of source lines 206 at this time is such that only source lines 206 corresponding to the frame in the horizontal direction to the left and right are maintained in a high-level state.

At this stage of completion of processing up to this point on the source driver 104 side, writing image signals to picture elements corresponding to the frame in the horizontal direction is executed by initiating drive of gate driver 105 and sequentially turning on gate lines 213 in accordance with start pulse (DY) 209 and shift clock (CLY) 208. The drive frequency of gate driver 105 at this time must be a frequency that provides sufficient time to write image signals to the liquid crystal picture elements. In addition, the image level at this time is made the black level if the frame is to be displayed as black, and, to realize other frame displays (such as a pattern), is made image levels corresponding to such displays.

The interval for writing actual image signals to liquid crystal picture elements is shown as interval 2 in FIG. 8C. Following completion of interval 2 shown in FIG. 8C, shift clock (CLX) 201 of source driver 104 is driven and source lines 206 corresponding to the frame in the horizontal direction that were written in interval 2 are reset in interval 3. In other words, drive is effected such that all source lines 206 become low level by maintaining start pulse (DX) 202 of source driver 104 unchanged at a low level and driving shift clock (CLX) 201 of source driver 104. At this time, enable signal (ENX) 203 of source driver 104 must be made low level such that no effect appears on the display screen.

In the present embodiment, in a case in which an input image signal having a number of picture elements equal to 800 dots horizontally by 600 dots vertically is to be displayed on liquid crystal panel 108 having a number of picture elements equal to 1280 dots horizontally by 1024 dots vertically, when the input image signal is displayed in the center and its periphery is made a frame, the drive of picture elements corresponding to the frame in the horizontal direction can be carried out not during the horizontal blanking interval but rather, during the vertical blanking interval.

Figure 1:
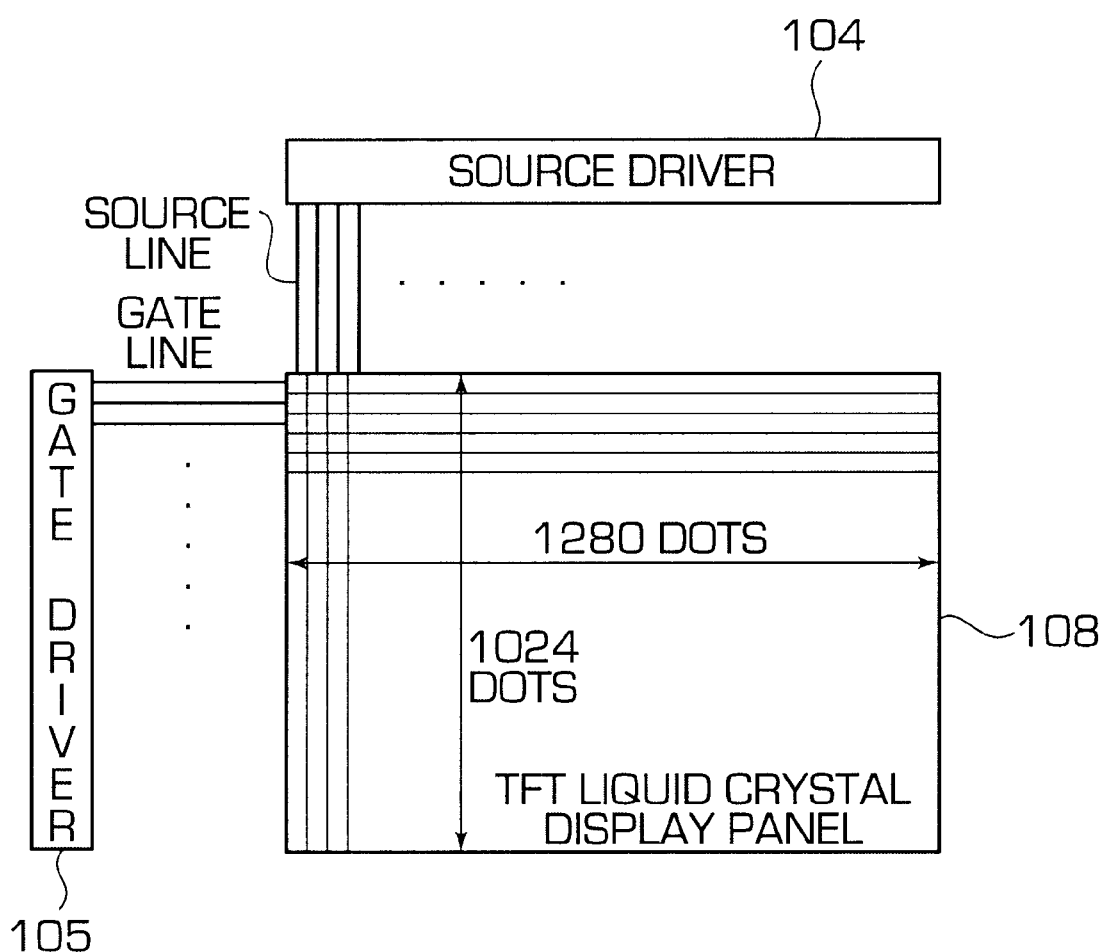
FIG. 1 shows the structure of a common liquid crystal panel using TFT elements.
Figure 2A:
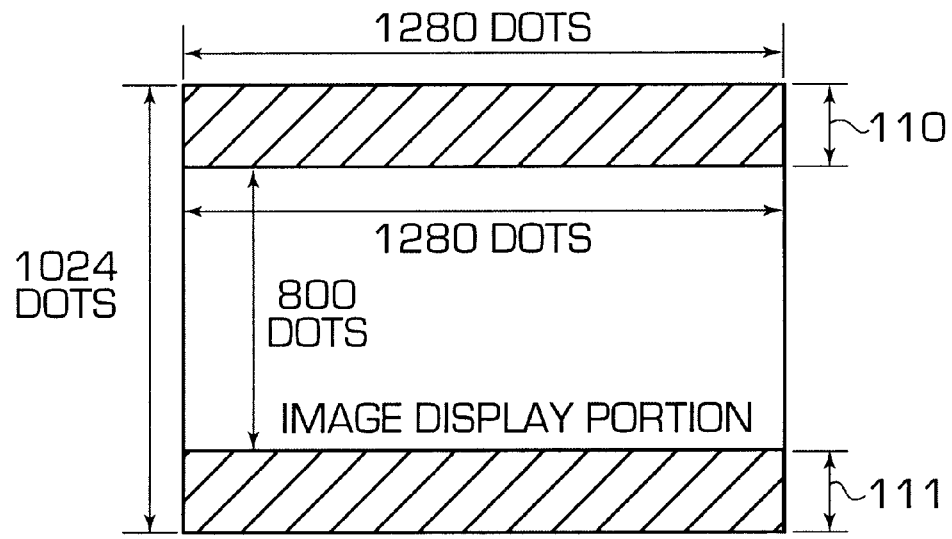
FIGS. 2A and 2B show examples of the display of images having fewer picture elements than the number of picture elements in the liquid crystal panel.
Figure 2B:
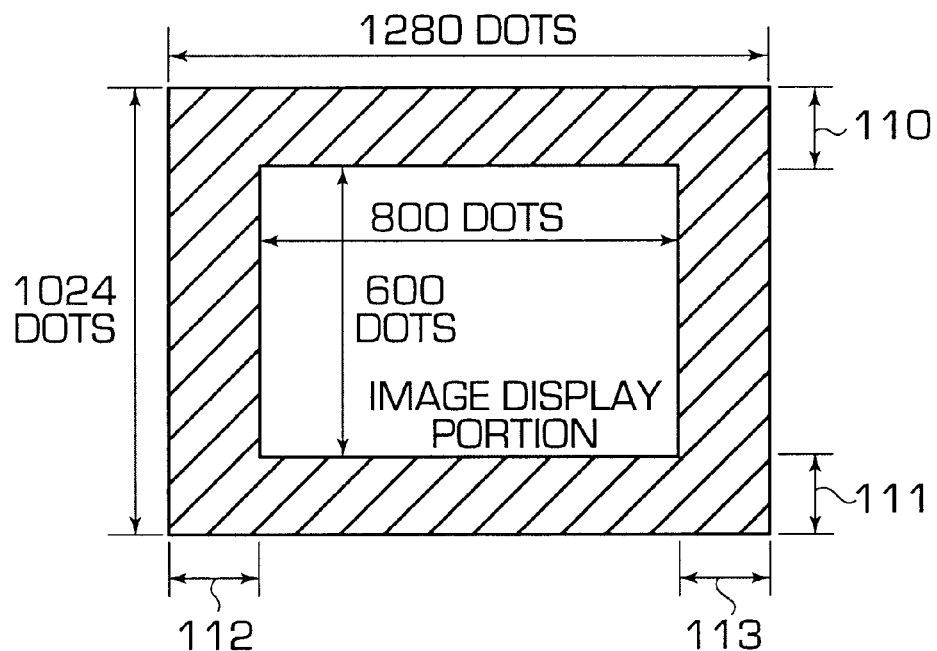
Figure 3A:
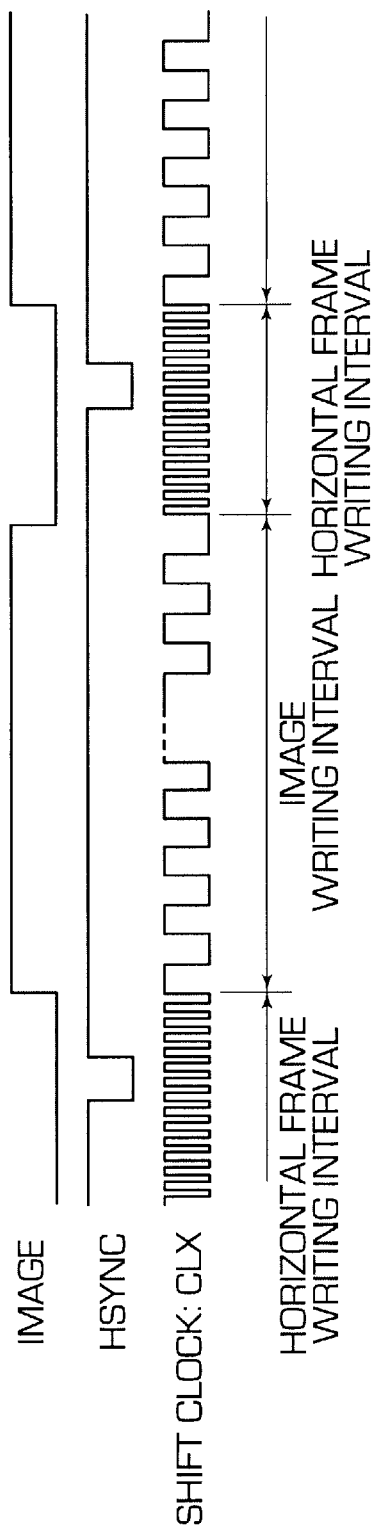
FIGS. 3A and 3B are drive timing charts of a liquid crystal driver of the prior art.
Figure 3B:
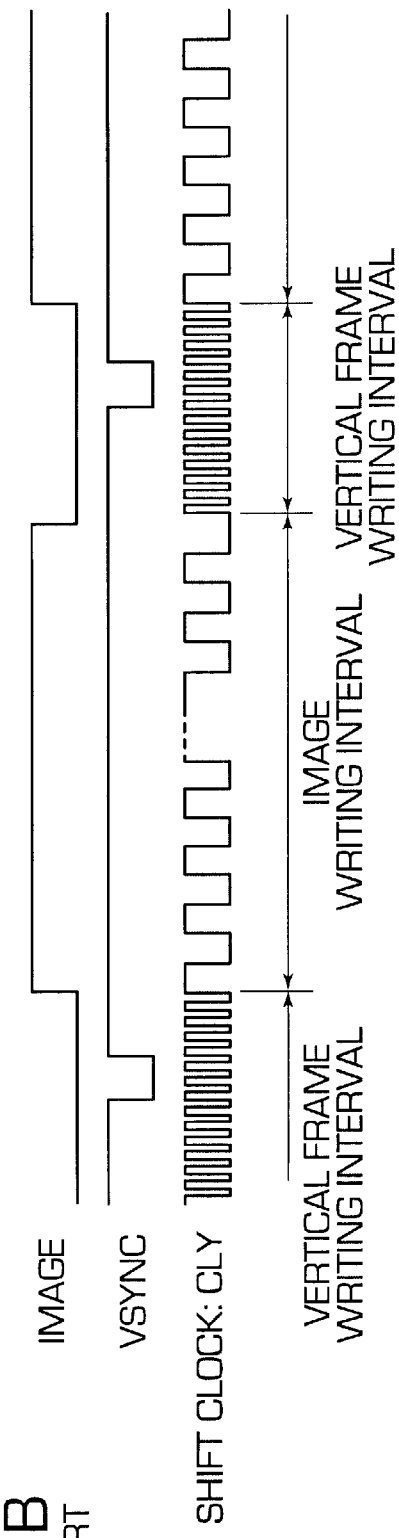

FIG. 8A shows a drive timing chart for the horizontal blanking interval and FIG. 8B shows a drive timing chart for the vertical blanking interval, these figures being basically equivalent to the timing charts shown in FIGS. 3A and 3B, respectively.

FIG. 9 is a schematic block diagram showing one example of timing control circuit 103 (FIG. 4) that generates each of the timing signals shown in FIG. 8. This circuit 103 inputs system clock 109 (phase-locked with vertical and horizontal synchronizing signals 106 and 102 inputted from terminals from PLL circuit 107 in addition to vertical and horizontal synchronizing signals 106 and 102; generates the various timing signals shown in FIG. 8; and consists of clock frequency divider circuit 41, vertical counter 42, decoders 43, 44, 45, 48, 49, and 50, clock switching circuit 46, and horizontal counter 47.

Clock frequency divider circuit 41 frequency-divides system clocks 109, outputs the four types of clocks CLX1, CLX2, CLY1, and CLY2 shown in FIG. 8, and supplies the clocks to clock switching circuit 46. Vertical counter 42 takes vertical synchronizing signal 106 as reset input and counts the frequency divided clocks of clock frequency divider circuit 41. Decoders 43, 44, and 45 each detect when the count output of vertical counter 42 reaches a predetermined value and respectively generate start pulse (DY) 209, enable signal (ENY) 210, and clock switching signal (CLY-SEL, CLY-ENABLE) shown in FIG. 8.

Horizontal counter 47 takes horizontal synchronizing signal 102 as the reset input and counts the frequency divided clocks of clock frequency divider circuit 41. Decoders 48, 49, and 50 each detect when the count output of horizontal counter 47 reaches a predetermined value and respectively output start pulse (DX) 202, enable signal (ENX) 203, and clock switching signal (CLX-SEL, CLX-ENABLE) shown in FIG. 8.

Clock switching circuit 46 selects and outputs each clock CLY and CLX of FIG. 8 in accordance with each output signal of decoders 45 and 50. The details of these components come within the sphere of design items, and further details are therefore not described herein. However, a person knowledgeable in the art would be able to easily design this timing control circuit 103 in accordance with the operation timing chart of FIG. 8.

While a preferred embodiment of the present invention has been described using specific terms, such description is for illustrative purposes only, and it is to be understood that changes and variations may be made without departing from the spirit or scope of the following claims.

What is claimed is:

1. An image display device having a liquid crystal display panel in which display picture elements are arranged in dot matrix form, and that displays a frame around the periphery of the display portion of the input image signal in cases in which the number of display picture elements that display said input image signal are fewer than the number of display picture elements of said liquid crystal panel; comprising:

a source driver for selecting sourcing of said display picture elements;

a gate driver for selecting gates of said display picture elements; and a control means for controlling the drive of said source driver and said gate driver such that signal writing for frame display in the horizontal direction is performed within the vertical blanking interval of said input image signal.

2. An image display device according to claim 1 wherein said source driver includes a shift register having shift output corresponding to sources of said display picture elements; and said control means comprises:

a source selection signal writing means that, in response to the start of said vertical blanking interval, writes to and holds in said shift register each source selection signal of display picture elements corresponding to said frame in a horizontal direction;

means that executes control such that, in response to completion of writing by said source selection signal writing means, while the held output of said shift register is being supplied to each source of said display picture elements, sequential gate selection signals are generated from said gate driver, and signals for displaying said frame in the horizontal direction are supplied to said display picture elements.

3. An image display device according to claim 2 wherein said control means further includes means that resets hold content of said shift register in response to completion of supply of said signals for display of a frame in a horizontal direction to said display picture elements.

4. An image display device according to claim 2 wherein the output frequency of source selection signals of said gate driver is selected as a frequency adequate for writing signals for display of a frame to said display picture elements.

5. An image display device according to claim 1 wherein said signals for display of a frame in a horizontal direction are signals of a fixed level or signals that realize a prescribed pattern.

6. An image display device according to claim 1 wherein said control means for controlling the drive of said source driver and said gate driver are such that signal writing for a horizontal frame area is performed within the vertical blanking interval of said image input signal.

* * * * *